Patented Mar. 27, 1928.

1,664,376

UNITED STATES PATENT OFFICE.

DUDLEY H. ROWLAND, OF DETROIT, MICHIGAN, ASSIGNOR TO AMERICAN ICHTHYOL OIL COMPANY, OF SAN ANTONIO, TEXAS, A CORPORATION OF TEXAS.

SULPHO-ICHTHYOLATE OF AMMONIUM AND PROCESS OF MANUFACTURE.

No Drawing.     Application filed February 4, 1927.     Serial No. 166,018.

It is known that a number of peculiar organic preparations, containing sulphur, derived by the distillation of the fossil remains of fishes and by the sulphonation of their distillates, have been used in medicine under various names, chief among them being "Ichthyol". The basis of all these preparations is a complex substance of variable composition having the properties of an organic acid and to which the name ichtosulphonic acids has been applied. The acid is not used as such, but instead its salts (chiefly ammonium and sodium compounds) are employed. The composition of ichto-sulphonic acids is now known to be somewhat variable. These preparations contain sulphur in three forms: (1) combined sulphur (organic sulphur) naturally occurring in the distillate; (2) sulphur introduced by sulphonating the tar-like distillate; and (3) sulphur chiefly in the form of ammonium sulphate or sodium sulphate.

It has also been observed that when several mineral oils are sulphonated with sulphuric acid and subsequently purified, a product is obtained which resembles very closely, in chemical and therapeutic properties, the ichto-sulphonic acids obtained by the distillation of shales containing the fossil remains of fishes. The chemical properties of the various ichto-sulphonic acids vary to some extent, the variation being due to the nature of the raw material and in part to the process of manufacture. The excellence of the new product obtained may be attributed to the source and kind of petroleum used as the raw material, as well as to the process used, and the highly refined nature of the composition, since almost all of the occluded salts are removed in the process. The characteristics of the new ammonium ichthyol sulphonate are: its viscous tar-like mass, very black in color, of a bitter taste and bituminous odor, its aqueous solution being clear and of a red-brown color. The product is perfectly soluble in a mixture of ether and alcohol. Hydrochloric acid precipitates from its aqueous solution a black sticky mass. Its powers as a reducing agent in aqueous solution are exhibited by the reduction of potassium permanganate to manganese dioxide. Barium chloride precipitates from its aqueous solution a dirty brown-gray precipitate, possessing a characteristic texture and being spongy-like in appearance.

The present invention consists in the process herein described and claimed, whereby I am enabled to separate the sulpho-compounds from petroleum in such condition and purity that they are capable of being utilized.

The new product is prepared as follows:

One volume of petroleum is treated with two volumes of concentrated sulphuric acid (sp. gr. 1.84). The mixture is heated on a water bath with constant stirring until a temperature of 180° F. has been attained, after which it is removed from the bath and allowed to stand for 24 hours without further heating, the stirring being maintained. Kerosene (distillate between 250° F. and 625° F.) is then added to thin the mixture. A saturated aqueous solution of sodium chloride is next added until frothing ceases. The sodium chloride destroys the excess sulphuric acid and produces a solution in which the sulphonated compounds are insoluble. The mixture is then thoroughly agitated and sufficient ammonium hydroxide is added to produce alkalinity. It is then cooled, kerosene being again added to further thin the mixture, and if desired more sodium chloride may be added. A black tar-like mass of sulpho-compounds separate from the mother liquor at this point. The tar-like mass is collected and pressed to remove most of the unsulphonated oil and salts which it contains as impurities. The tar-like mass is then treated with an alcohol-ether solution (one volume of absolute ethyl alcohol and one volume of sulphuric ether), being stirred vigorously until solution is complete. The solution is then filtered and water added to the filtrate. The filtrate is next distilled on a water bath until the alcohol and ether are removed. The residue in the still is then cooled slightly and centrifuged to remove any remaining unsulphonated oil. It is again filtered, and the filtrate evaporated on a water bath to the desired consistency.

Having thus fully described my said invention, what I claim as new and desire to secure by Letters Patent is:

1. The process herein described for the production of ammonium ichthyol sulphonate, which comprises sulphonating petroleum, heating the mixture with agitation, withdrawing the heat while maintaining the agitation, diluting with kerosene, adding a salting-out reagent and agitating until frothing ceases, then adding ammonium hydroxide to alkaline reaction, further diluting with kerosene, and recovering the product, substantially as set forth.

2. The process herein described for the production of ammonium ichthyol sulphonate, which comprises sulphonating petroleum and heating with agitation, withdrawing the heat while maintaining agitation, diluting with kerosene, adding a salting-out reagent and agitating until frothing ceases and rendering insoluble the sulphonated compounds, then adding ammonium hydroxide to alkaline reaction, and further diluting with kerosene, separating the product from the mother liquor, extracting the unconverted oil and salt, dissolving the residue in a solvent, filtering, adding water to the filtrate, and recovering the product from the filtrate, substantially as set forth.

3. The process herein described for the production of ammonium ichthyol sulphonate, which comprises first treating petroleum with concentrated sulphuric acid and heating with agitation, diluting with kerosene, then treating with a concentrated solution of sodium chloride, then adding ammonium hydroxide to alkaline the reaction, then diluting further with kerosene, then adding a further supply of sodium chloride, then separating the product from the mother liquor, pressing and working the product mechanically to remove the greater part of the unconverted oil and salt, then dissolving it in a mixture of alcohol and ether, then filtering the solution and adding water to the filtrate and distilling off the alcohol and ether, then centrifuging the residue, and then evaporating the liquid to the desired consistency, substantially as set forth.

4. As a new product, sulpho-ichthyolate of ammonium, a dark brown viscous mass containing about 50% water and having a bitter, burning taste and a faint sweet odor, being completely soluble in water to a clear-brown solution, its complete solubility in a 160 proof alcohol-ether mixture, hydrochloric acid precipitating from its aqueous solution a black sticky mass, and barium chloride precipitating from its aqueous solution a greyish-brown mixture of barium sulphate and barium sulpho-ichthyolate, substantially as set forth.

In witness whereof, I have hereunto set my hand at Detroit, Michigan this 31st day of January, A. D. nineteen hundred and twenty-seven.

DUDLEY H. ROWLAND.